United States Patent [19]
Borland et al.

[11] Patent Number: 6,128,382
[45] Date of Patent: Oct. 3, 2000

[54] SYSTEM AND METHOD FOR ENABLING A CALLER TO SELECTIVELY LEAVE A MESSAGE ON A TELEPHONE WITHOUT RINGING THE TELEPHONE

[75] Inventors: David Borland; Joe Peterson, both of Austin, Tex.

[73] Assignee: Advanced Micro Devices, Inc., Sunnyvale, Calif.

[21] Appl. No.: 08/987,676

[22] Filed: Dec. 9, 1997

[51] Int. Cl.[7] .................................................. H04M 1/64
[52] U.S. Cl. ........................................ 379/373; 379/67.1
[58] Field of Search ............................... 379/88.12, 67.1, 379/88.23, 88.24, 88.25, 88.26, 70, 88.16, 372, 373, 375

[56] References Cited

U.S. PATENT DOCUMENTS

| | | | |
|---|---|---|---|
| 5,062,133 | 10/1991 | Melrose | 379/911 |
| 5,086,458 | 2/1992 | Bowen | 379/102.02 |
| 5,157,712 | 10/1992 | Wallen, Jr. | 379/77 |
| 5,375,161 | 12/1994 | Fuller et al. | 379/210 |
| 5,388,150 | 2/1995 | Schneyer et al. | 379/142 |
| 5,563,935 | 10/1996 | Small | 379/199 |
| 5,978,451 | 11/1999 | Swan et al. | 379/88.24 |

*Primary Examiner*—Scott L. Weaver
*Attorney, Agent, or Firm*—Conley Rose & Tayon PC; Jeffrey C. Hood

[57] ABSTRACT

The present invention comprises an improved telephone system and method that enable a caller to leave a message on a telephone without the telephone first generating a ring sound. The telephone receives an incoming telephone call from a caller, and if the ring/message option feature is enabled, the telephone answers the incoming telephone call. The telephone answers the incoming telephone call prior to the telephone generating a ring sound. The caller is then given the choice by the telephone to either access an answering machine in order to leave a message or have the telephone generate a ring sound in order to alert the user or users to the incoming telephone call. If the caller chooses to leave a message, the telephone transfers control to an answering machine unit which plays a message requesting the caller to leave a message after the answering machine unit generates a characteristic tone. After the answering machine unit generates the characteristic tone, the answering machine unit receives and records a message from the caller. Thus, the caller may leave a message without disturbing the user. For example, the caller may call a telephone with the ring/message option feature and leave a message late at night when the user or users are asleep.

13 Claims, 5 Drawing Sheets

SYSTEM AND METHOD FOR ENABLING A CALLER TO SELECTIVELY LEAVE A MESSAGE ON A TELEPHONE WITHOUT RINGING THE TELEPHONE

FIELD OF THE INVENTION

The present invention relates to a telephone system and method for enabling a caller to leave a message on a telephone without ringing the telephone.

DESCRIPTION OF THE RELATED ART

Telephone subscribers communicate via a vast telephone network, referred to as the Public Switched Telephone Network (PSTN). In the present disclosure, the term "PSTN" is intended to include the analog telephone network or POTS (Plain Old Telephone Service), ISDN (Integrated Services Digital Network), DSL (Digital Subscriber Line), and Wireless Local Loop (WLL), among others.

A telephone subscriber's communications devices, e.g., telephones, are typically connected in parallel to a telephone line which links a subscriber's premises to a telephone service provider's central office. An ordinary telephone is the most familiar of such communications devices. An ordinary telephone includes a handset, and the handset includes a receiver and a transmitter. The receiver is designed to be placed over a user's ear during use, and the transmitter designed to be positioned in close proximity to the user's mouth during use.

In a POTS system, when the telephone is not in use, the telephone is disconnected from the telephone line, except for a ringer circuit. When a caller places a telephone call to a receiving party, switching equipment in the central office transmits a series of ring signals over the receiving party's telephone line. The ring signals cause the ringer circuit of the receiving party's telephone to generate sounds which alert the receiving party to the incoming telephone call. At the same time, the switching equipment sends a series of ring-back signals to the caller to let the caller know that the telephone call is being placed. When the receiving party answers the incoming telephone call, a communication is established between the caller and the receiving party.

Several different types of communications devices are designed to automatically transmit or receive information following detection of one or more ring signals. Examples of such communications devices include telephone answering machines and communications devices equipped with modulator-demodulators (modems). An answering machine typically includes control circuitry which electrically connects a voice message unit to the telephone line after a predetermined number of ring signals are detected, causes the voice message unit to transmit (i.e., play back) a pre-recorded outgoing voice message, and then receives and records any incoming voice message transmitted by the caller following transmission of the outgoing voice message. Digital communications devices equipped with modems exchange frequency-encoded information via the telephone network. Facsimile (fax) machines are examples of such digital communications devices. A fax machine typically includes control circuitry which electrically connects a modem to a telephone line after a predetermined number of ring signals are detected, then either transmits or receives frequency-encoded digital information. A modulator portion of a modem within a transmitting fax machine converts a digital value (i.e., a logic one or a logic zero) to a corresponding analog tone. A demodulator portion of a modem within a receiving fax machine performs the opposite function, converting the analog tone to the corresponding digital value.

Telephone service providers also offer "caller ID" services which provide information about a caller. Devices which receive, store, and display digital caller ID information are widely available. The caller ID service is typically available to telephone subscribers for a small additional monthly fee. Under current standards, frequency-encoded digital caller ID information is transmitted between the first and second ring signals. Information about a caller is thus received, stored, and displayed by a caller ID device before a user would normally answer a ringing telephone. Caller ID information is typically recorded by caller ID devices whether the associated telephone is answered or not. Caller ID circuitry may be included as part of a telephone or the caller ID circuitry may be part of a separate box that is also connected to the telephone line.

A telephone system would be desirable that provides the user or the users with additional features for a more effective use of their telephone service. Desirable features could be, for example: a feature that would enable the user to stop accepting incoming calls and inform the caller to that effect; a feature that could identify the caller and/or the callee of incoming call and alert the user to the identity of the caller and/or callee. Such features would enhance the usefulness of a user's telephone service.

SUMMARY OF THE INVENTION

The present invention comprises an improved telephone system with additional features that enable a user or users to make more effective use of their telephone service.

In the first embodiment, the present invention comprises an improved telephone system and method that enables a caller to selectively either leave a message on a telephone without the telephone first generating a ring sound or direct the telephone to generate standard ring sounds. The telephone receives an incoming telephone call from a caller, and if the ring/message option feature is enabled, the telephone answers the incoming telephone call. The telephone answers the incoming telephone call prior to the telephone generating a ring sound. In an embodiment where multiple telephones are connected on the same line, a master telephone answers the incoming telephone call prior to any of the telephones connected on the line generating a ring sound. The telephone plays a message to the caller providing the choice to either access an answering machine in order to record a message or have the telephone generate a ring sound in order to alert the user or users to the incoming telephone call.

If the caller chooses to leave a message, the telephone transfers control to an answering machine unit. The answering machine unit plays a message requesting the caller to leave a message and generates a characteristic tone. After the answering machine unit generates the characteristic tone, the answering machine unit receives and records a message from the caller. Thus, the caller may leave a message without disturbing the user. For example, the caller may call a telephone with the ring/message option feature and leave a message late at night when the user or users are asleep.

If the caller chooses to direct the telephone to generate a ring sound to alert the user or users to the incoming telephone call, the telephone generates a ring sound and does not transfer control to the answering machine unit. In an embodiment where multiple telephones are connected on the same line, the master telephone and at least a subset of the other telephones that are connected on the same line answer the incoming telephone call. However, only the telephone designated as the master telephone prompts the caller. The other telephones are configured to receive the caller's input to the master telephone prompting and act accordingly. If, for example, the caller chooses to ring the telephone, the master telephone and the other telephones generate ring sounds to alert the user or users to the incoming telephone call. The user may then answer the incoming telephone from any of the telephones that are connected on the same line and engage in a conversation with the caller.

In the second embodiment, the present invention comprises a system and method for forwarding a message recorded by a caller on a telephone to one or more telephone numbers. Prior to activating the message-forwarding feature, the telephone receives input from the user to select one or more pre-selected telephone numbers. Messages left by the callers on the telephone will be forwarded to the one or more pre-selected telephone numbers. In one embodiment, the telephone numbers are entered into the telephone using the keypad of the telephone.

If the message-forwarding feature is activated and an incoming telephone call is received from a caller, the telephone answers the telephone call and prompts the caller to record a message on the telephone. The telephone prompts the caller by playing a default message or a message pre-recorded by the user. After receiving the message from the caller, the telephone stores the received message in a storage medium. In one embodiment, the storage medium comprises random access memory or flash memory. In another embodiment, the storage medium comprises a cassette tape player with playback capabilities.

After the caller leaves a message on the telephone, the telephone retrieves the message and begins the forwarding process. The telephone attempts to deliver the message to all of the telephone numbers that were indicated by the user. If a number is inaccessible, the telephone attempts to deliver the message up to a maximum number of attempts. If the message is not delivered after the maximum number of attempts, the telephone generates an error message indicating the inaccessible telephone numbers. In one embodiment, the telephone requests the recipient of the telephone call to enter a personal identification number (PIN) prior to the telephone playing the message to the recipient. A correct PIN indicates to the telephone that the recipient has the authority to receive the message.

In another embodiment, the telephone only forwards messages left on the telephone by preferred callers. A list of preferred callers is maintained by the user and stored in the telephone. Upon receiving an incoming telephone call and receiving a message from a caller, the telephone determines the identity of the caller and whether the caller is a preferred caller. The telephone forwards the message only if the caller is a preferred caller. In one embodiment, the caller's identity is determined using a caller ID unit.

BRIEF DESCRIPTION OF THE DRAWINGS

Other objects and advantages of the invention will become apparent upon reading the following detailed description and upon reference to the accompanying drawings in which.

Figure 1:
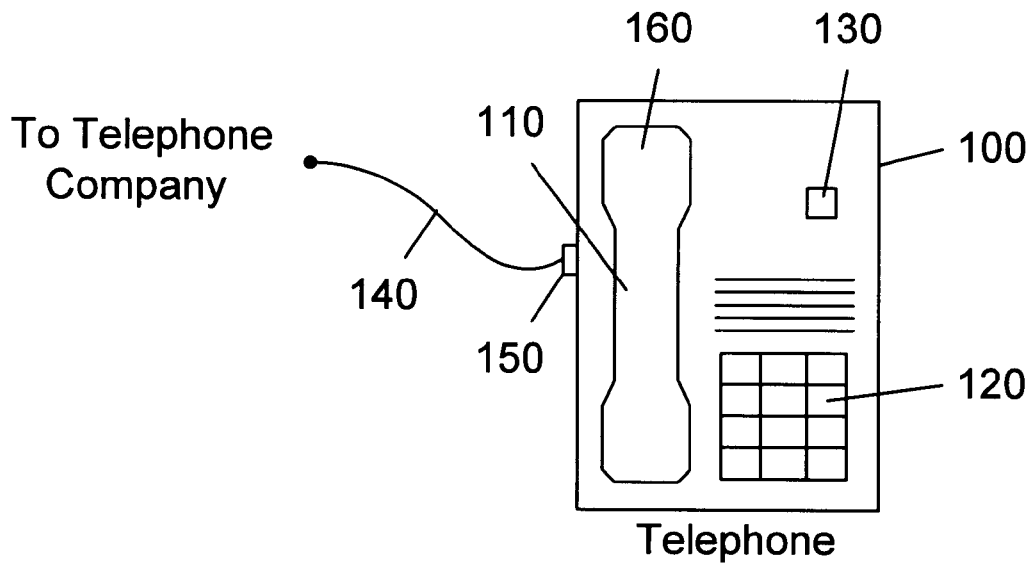
FIG. 1 shows a telephone with improved features and a switch for enabling/disabling the improved features.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

First embodiment, system and method for enabling a caller to leave a message on a telephone without the telephone generating a ring sound In the first embodiment, the present invention comprises an improved telephone system that enables a caller to leave a message on a telephone without the telephone first generating a ring sound. Such a telephone system is shown in FIG. 1. Telephone 100 is connected to the telephone service provider's central office using telephone line 140. Telephone 100 is coupled to telephone line 140 through port 150. Telephone signals are sent and received to and from the central office. As used in the present invention, "telephone" may refer to a conventional analog telephone, a digital telephone, a cordless telephone, or a cellular telephone. Furthermore, the telephone functions may be performed by a computer, a personal digital assistant (PDA), a web surfer, or any other system that has a sub-function that acts like a telephone.

Telephone 100 further comprises handset 110. Handset 110 comprises an earphone for receiving voice signals and generating audible sound and a microphone for transmitting voice over the telephone line. In a POTS network, when the handset is located in the cradle of the telephone, the placement and/or weight of the handset 110 maintains hook switch 160 in the open position. Once the handset 100 is picked up by the user, hook switch 160 closes and telephone 100 turns on for placing or answering a call. It is noted that hook switch 160 may be closed by other means, such as the user pressing a "talk" button in the case of a cordless telephone. Furthermore, for an ISDN, DSL, WLL, or other networks, the telephone answers or places a telephone call using means appropriate to that network.

Figure 2:
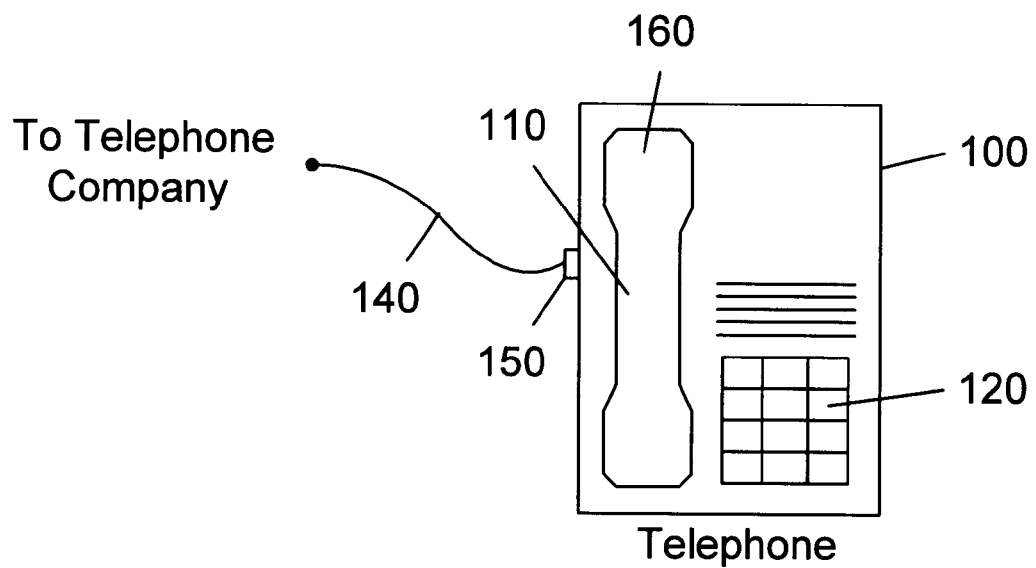
FIG. 2 shows a telephone with improved features.

Telephone 100 includes a ring/message option switch 130. Ring/message option switch 130 is preferably a toggle switch for turning the ring/message option feature on and off. The ring/message option feature will be discussed further below. Alternatively, the ring/message option feature is activated and deactivated by lifting handset 110 and entering a numeric code using the keypad 120. For example, *28 may be the activation code and *29 may be the deactivation code. Such a telephone, without ring/message option switch 130, is shown in FIG. 2. In another embodiment, the ring/message option feature is enabled/disabled using a computer system coupled to the telephone, wherein the computer is either directly coupled to the telephone or is coupled to the telephone through the telephone line.

Figure 3:
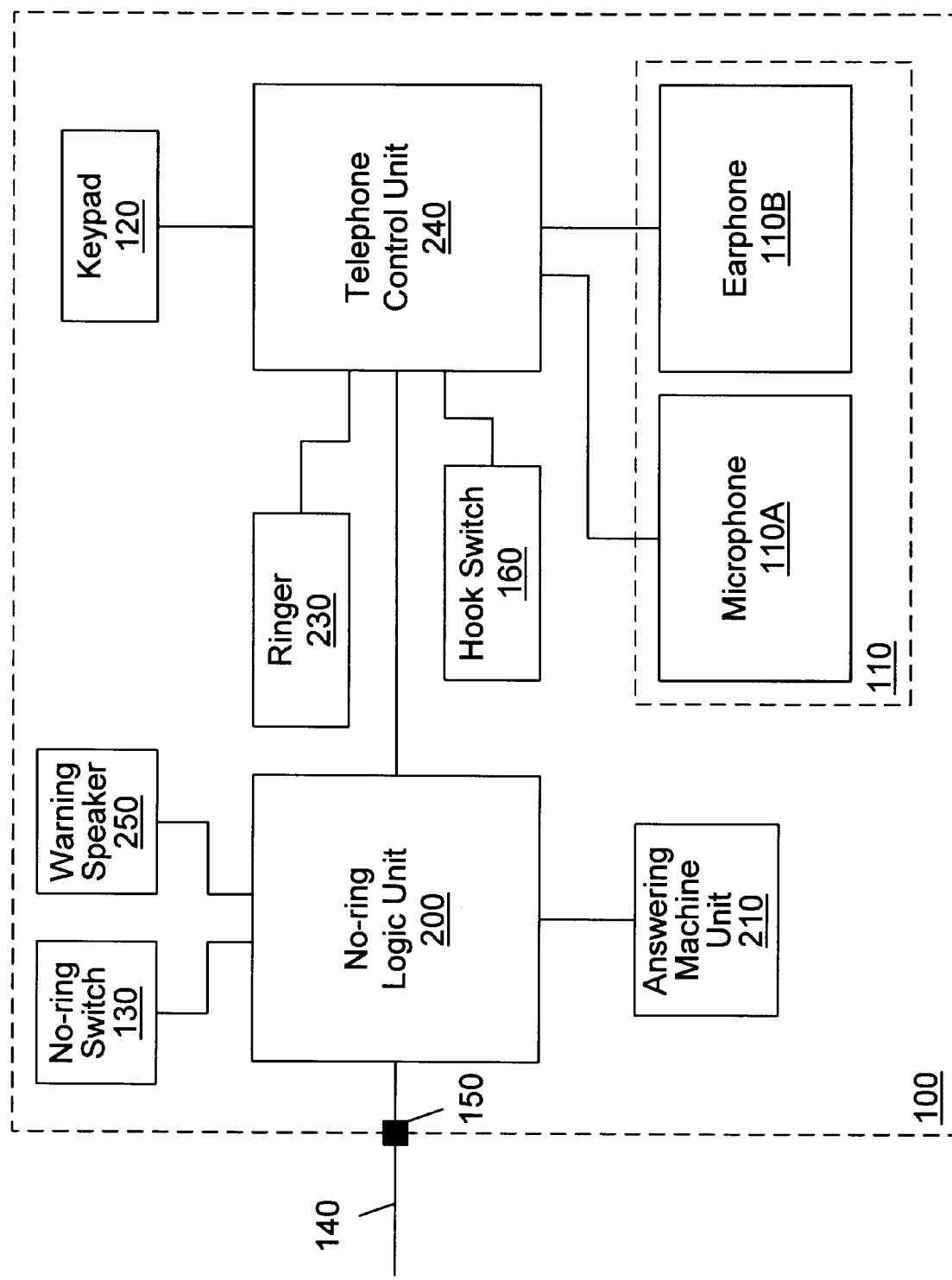
FIG. 3 shows a block diagram of a telephone with a ring/message option feature.

FIG. 3 shows a block diagram of telephone system 100. When a caller places a call, a ring signal is transmitted to telephone system 100 through telephone line 140. Ring/message option logic unit 200, which is directly coupled to port 150, first receives the incoming ring signal. In an embodiment where the ring/message option feature is disabled by either toggling ring/message option switch 130 or by entering the appropriate activation/deactivation code through keypad 120, ring/message option logic unit 200 transmits the ring signal to telephone control unit 240.

Telephone control unit 240 performs regular telephone functions as are well known in the art. Upon receiving a ring signal, telephone control unit 240 sends the ring signal to ringer 230. Ringer 230 produces an audible ring that alerts the user to the incoming call, which the user can then answer. In a POTS, the user answers the telephone call by lifting handset 110, which closes switch 160 and places the telephone off-hook. For an ISDN, DSL, WLL, or other types of telephone network, the telephone is answered by other means appropriate to the protocol used. The user then transmits voice to the caller by talking into microphone 110A and receives sound by listening to earphone 110B.

The user can enable/disable the ring/message option feature either by operating switch 130 on the telephone or by entering a numeric code using the telephone's keypad. In an embodiment where the location, i.e., the home, includes a plurality of telephones, then preferably one of the telephones is the master telephone. Upon receiving an incoming telephone call, the master telephone answers the call before any other telephone in the household. In an embodiment where the ring/message option feature is enabled, the master telephone performs the functions associated with the ring/message option feature. In an embodiment where the ring/message option feature is not enabled, the master telephone allows the telephone signal to be transmitted to all the telephones in the household. Users may then answer any of the telephones in a regular fashion.

If the ring/message option feature is enabled and a call is received by the telephone, ring/message option logic unit 200 answers the telephone call and does not transmit the ring signal to telephone control unit 240. Consequently, ringer 230 does not ring to alert the user to the incoming telephone call.

In one embodiment, telephone system 100 comprises warning speaker 250. In this embodiment, ring/message option logic unit 200 sends a signal to warning speaker 250 when the ring/message option feature is enabled and when an incoming call is received. Warning speaker 250 generates a sound that alerts the user to the incoming call and to the fact that the ring/message option feature is enabled. The sound generated by warning speaker 250 is distinctively different from the sound generated by ringer 230. The sound generated by warning speaker 250 is short in duration and not very loud and is thus less disturbing than a ring sound.

When the ring/message option feature is enabled, ring/message option logic unit 200 answers the incoming telephone call and plays an outgoing message to the caller giving the caller the choice of either accessing an answering machine unit for leaving a message or the telephone generating a ring sound in order to alert the user or users to the incoming telephone call. The outgoing message could either be a prerecorded message that is stored in ring/message option logic unit 200 or the outgoing message could be a message recorded by the user using headset 110 during setup or at a later time prior to receiving the incoming telephone call. The outgoing message could, for example, be: "Please enter '1' to leave a message without ringing the telephone or '2' to ring the telephone." The caller may then enter '1' or '2' by pressing the appropriate number on the caller's telephone keypad.

If the caller enters '2', the telephone generates a ring sound and transfers control to telephone control unit 240. A user may then answer the telephone call in a regular fashion. If the caller enters '1', the telephone transfers control to answering machine unit 210. In another embodiment, the answering machine unit is an external unit coupled to telephone 100. Answering machine unit 210 prompts the caller to leave a message after a characteristic tone. The caller may then leave a message and terminate the call. A telephone with the ring/message option feature enables a caller to place a telephone call and leave a message at any time without disturbing the user or users. For example, a caller can place a call late at night and just leave a message without the telephone generating any disturbing ring sounds.

In an embodiment where multiple telephones are connected on the same line, the master telephone and at least a subset of the other telephones that are connected on the same line answer the incoming telephone call. However, only the telephone designated as the master telephone performs the caller prompting. The other telephones are configured to receive the caller's input to the master telephone prompting and act accordingly. If, for example, the caller chooses to ring the telephone, the master telephone and the other telephones generate ring sounds to alert the user or users to the incoming telephone call. The user may then answer the incoming telephone from any of the telephones that are connected on the same line and engage in a conversation with the caller.

Figure 4:
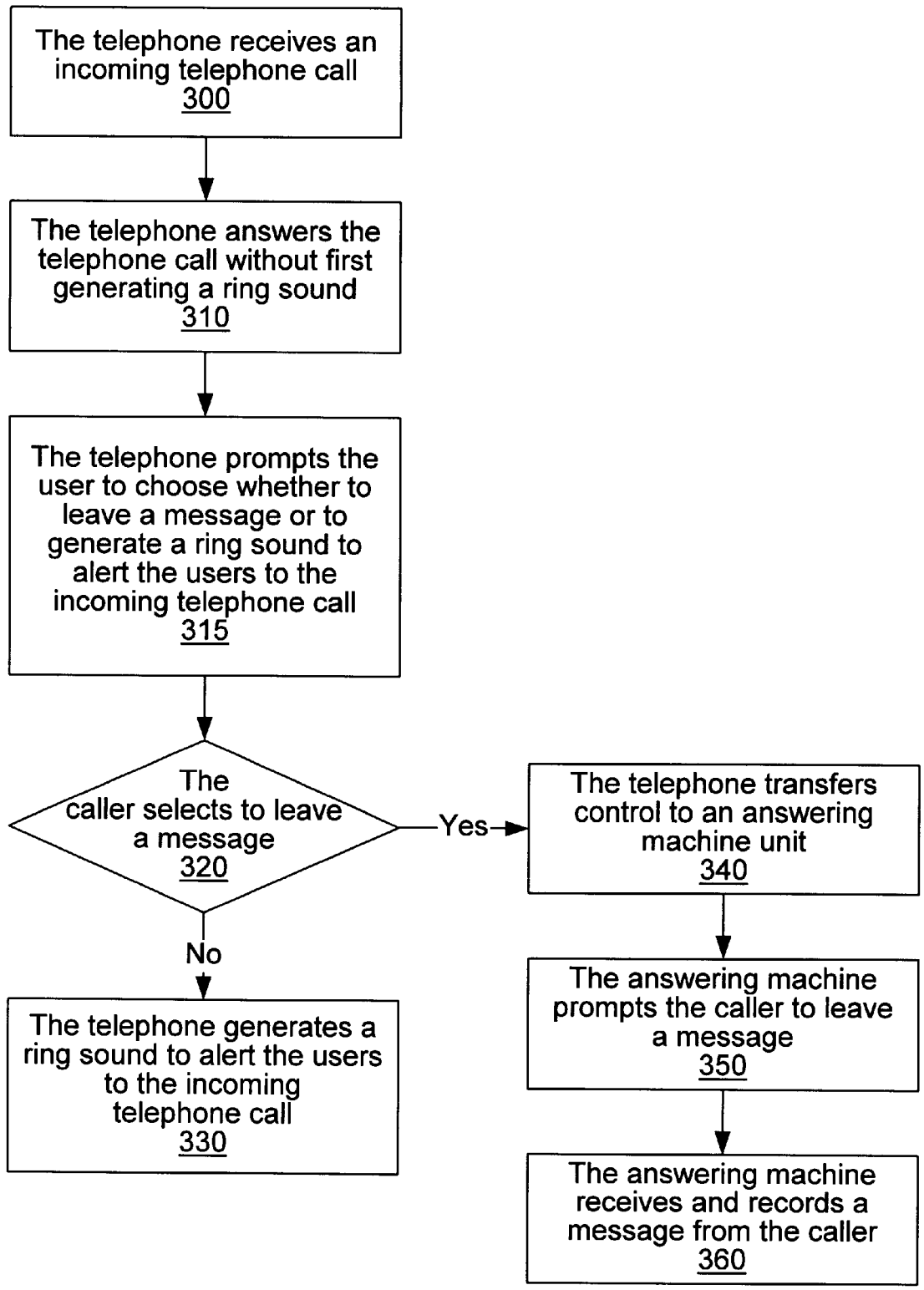
FIG. 4 shows a flowchart describing a method that enables a caller to selectively leave a message on a telephone without ringing the telephone.

The flowchart of FIG. 4 describes the method for enabling a caller to leave a message on a telephone without the telephone generating a ring sound. In step 300, the telephone receives an incoming telephone call from a caller. In step 310, the telephone answers the telephone call without first generating a ring sound. In an embodiment where multiple telephones are connected on the same line, the telephone designated as the master telephone answers the incoming telephone call prior to the other telephones on the line generating a ring sound.

In step 315, the telephone prompts the user to choose whether to leave a message or to have the telephone generate a ring sound to alert the users to the incoming call. If in step 320, the caller selects to leave a message, the telephone transfers control to an answering machine unit in step 340. In step 350, the answering machine prompts the caller to leave a message, and in step 360, the answering machine receives and records a message from the caller. The telephone call is then terminated.

If in step 320, the caller does not select to leave a message, in step 330, the telephone generates a ring sound that alerts the user to the incoming telephone call. A user may then answer the incoming telephone call in a regular fashion.

Second embodiment, system and method for forwarding a message left from a caller on a telephone to one or more telephone numbers In the third embodiment, the present invention comprises an improved telephone system and method that forwards a message left from a caller on a telephone to one or more telephone numbers. Such a telephone system is shown in FIG. 1. In this embodiment, switch 130 is used for activating the message-forwarding feature. Alternatively, the message-forwarding feature is activated by lifting handset 110 and entering a numeric code through keypad 120. Such a telephone, without switch 130, is shown in FIG. 2. As described above, the feature may also be activated by a computer connected to the telephone. As used in the present invention, "telephone" may refer to a conventional telephone, a digital telephone, cordless telephone, or a cellular telephone. Furthermore, the telephone functions may be performed by a computer, a PDA, a web surfer, or any other system that has a sub-function that acts like a classic telephone.

Figure 5:
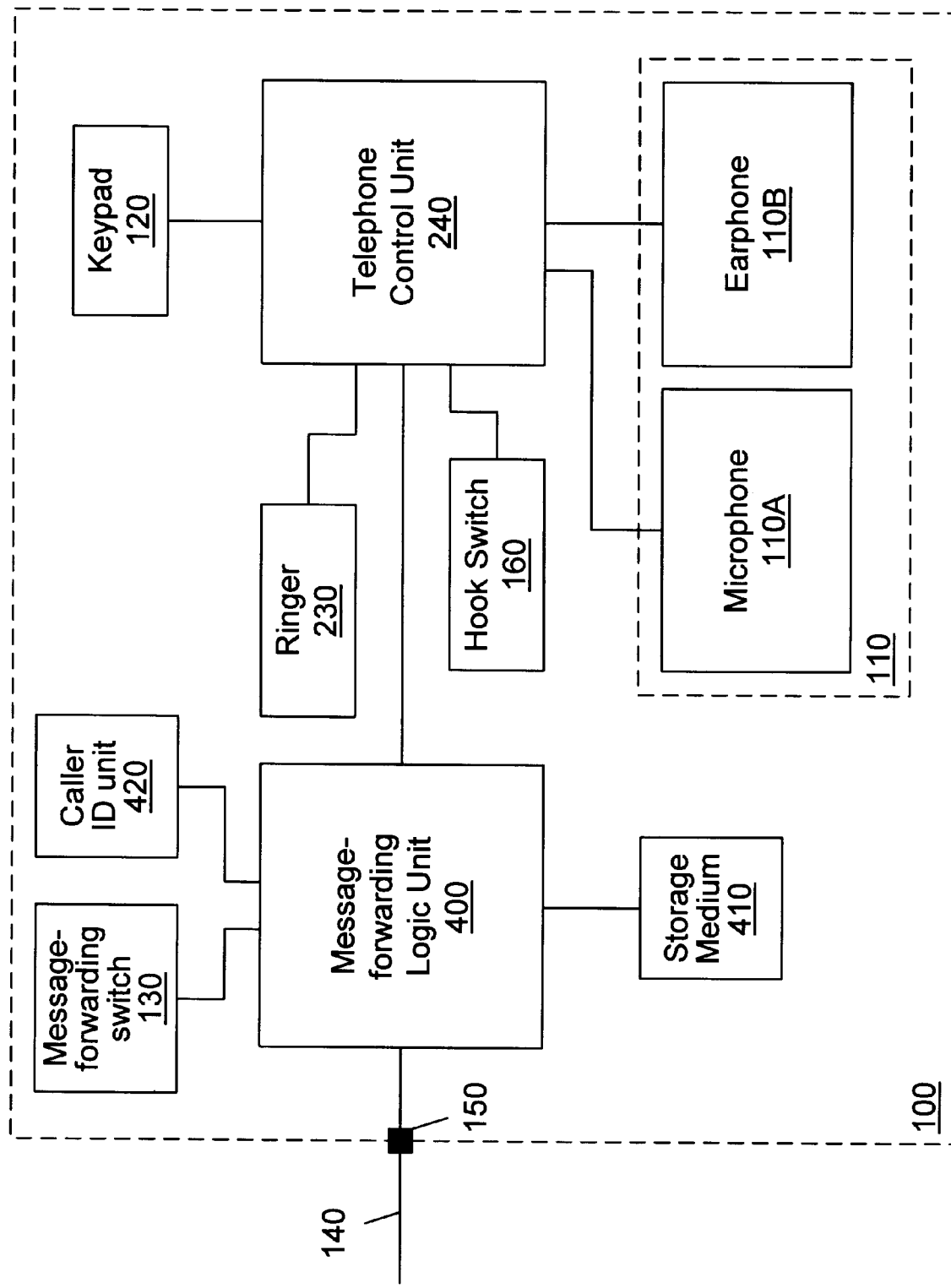
FIG. 5 shows a block diagram of a telephone with a feature for forwarding a message left form a caller on the telephone.

FIG. 5 shows a block diagram of telephone system 100 with the message-forwarding feature. The message-forwarding feature enables the user or users of the telephone to receive at a remote location a message that was left on the telephone by a caller.

The user must first enter one or more pre-selected telephone numbers, wherein messages left by the callers will be forwarded to the one or more pre-selected telephone numbers. In one embodiment, the user enters the pre-selected telephone numbers into the telephone by lifting the handset 110 of telephone 100, entering a numeric code through keypad 120, and then entering the one or more pre-selected telephone numbers. Message forwarding logic unit 400 receives and stores the pre-selected telephone numbers. In an embodiment where the telephone comprises a speakerphone mode, the user may enter the telephone numbers by placing the telephone in speakerphone mode. Having multiple pre-selected telephone numbers enables the user, for example, to receive messages left on a telephone at home to a telephone number at work and to a cellular telephone number.

The user activates the message-forwarding feature either by toggling switch 130 or by entering a numeric code through keypad 120. When the message-forwarding feature is activated and the telephone receives an incoming telephone call, message-forwarding logic unit 400 answers the incoming call and does not transmit an incoming ring signal to telephone control unit 240. In an embodiment where multiple telephones are connected on the same line, a master telephone comprising message-forwarding logic unit 400 answers the telephone before another telephone connected on the same line.

In one embodiment, the user enters the one or more pre-selected telephone numbers and activates the message-forwarding feature by placing a telephone call to the telephone from a remote location.

After answering the telephone call, message-forwarding logic unit 400 prompts the caller to leave a message. In one embodiment, the outgoing message is a message that was recorded by the user prior to activating the message-forwarding feature. In another embodiment, the outgoing message is a default message stored in message-forwarding logic unit 400. After listening to the outgoing message, the caller may choose to leave a message or hang-up. If the caller decides to leave a message, message-forwarding logic unit 400 saves the caller's message in storage medium 410. In one embodiment, storage medium 410 comprises random access memory or flash memory. In this embodiment, message-forwarding logic unit 400 performs an analog-to-digital conversion on the caller's message before storing the message in the random access memory or flash memory. Conversion from digital to analog by the message-forwarding logic unit 400 is performed when retrieving the message from the random access memory or flash memory. In another embodiment, storage medium 410 comprises a cassette tape player with playback capabilities.

After storing the caller's message, message-forwarding logic unit 400 begins the message forwarding process. Message-forwarding logic unit 400 places telephone calls to all the pre-selected telephone numbers. Message-forwarding logic unit 400 attempts to place a telephone call to each of the pre-selected numbers for up to a default five attempts. The maximum number of attempts is user defined and can be changed by the user. If a message cannot be delivered after the maximum number of attempts, an error message is generated by message-forwarding logic unit 400 to indicate that. In one embodiment, the user hears the error message next time the user operates the telephone.

In one embodiment, the user stores a personal identification number (PIN) in the telephone, wherein the user uses the PIN to identify the user to the telephone. The telephone, before delivering a message to a telephone number, prompts the recipient of the telephone call for a PIN. The telephone uses the PIN to determine the identity of the recipient of the telephone call. The telephone only delivers the message if the entered PIN matches the PIN already stored in the telephone.

In one embodiment of the invention, the user indicates a list of preferred callers from which the user wishes to receive forwarded messages. Thus, for example, a user can receive only important messages from family members or important business contacts and not from a telemarketer. Prior to activating the message-forwarding feature, the user programs the telephone with a list of the preferred callers. Upon receiving an incoming telephone call and while taking a message, message-forwarding logic unit 400 determines the identity of the caller. In one embodiment, message-forwarding logic unit 400 obtains the identity of the caller from caller ID unit 420. If the caller is comprised in the list of preferred callers, message-forwarding logic unit 400 forwards the message to the pre-selected telephone numbers. Otherwise, the caller's message is stored in the telephone for the user to listen to at a later time directly from the telephone. In one embodiment, all the recorded messages, including the ones from preferred callers, are saved for access by the user at a later time. In another embodiment, the user specifies a list of non-preferred callers. In this embodiment, all callers' messages are forwarded except for messages left from callers that are comprised in the non-preferred list.

Figure 6:
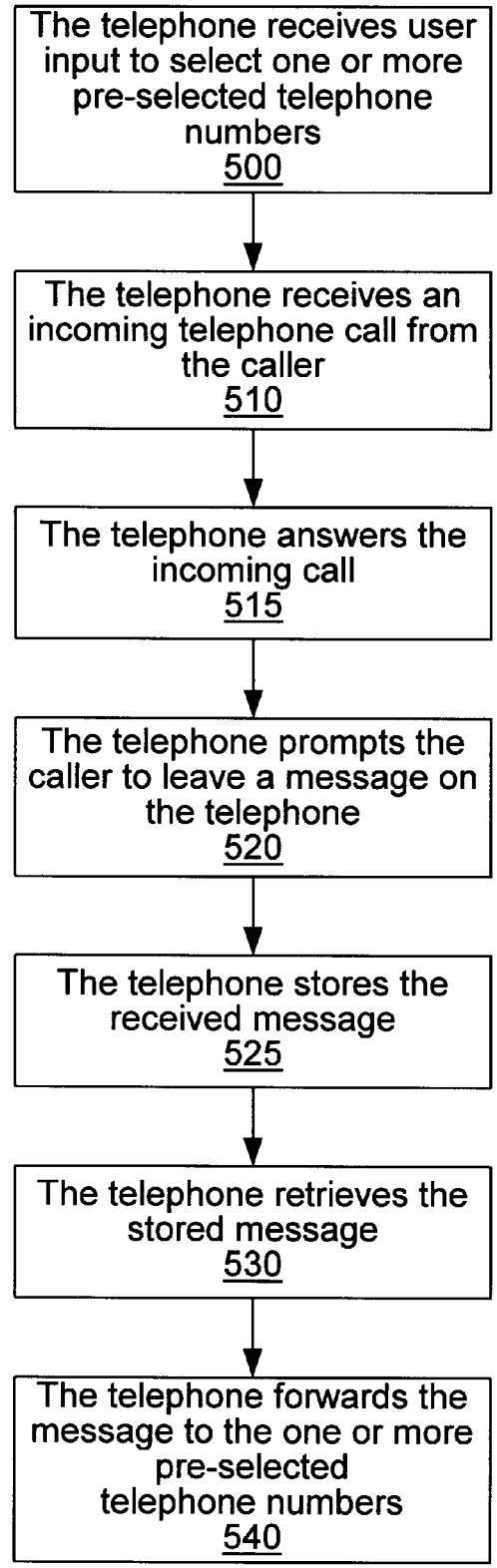
FIG. 6 shows a flowchart describing a method for forwarding a message left by a caller on a telephone to one or more telephone numbers.

The flowchart of FIG. 6 describes the method for forwarding a message left by a caller on a telephone to one or more telephone numbers. In step 500, the telephone receives input from the user to select one or more pre-selected telephone numbers. Messages left by the callers on the telephone will be forwarded to the one or more pre-selected telephone numbers. In step 510, the telephone receives an incoming telephone call from the caller, and in step 515, the telephone answers the telephone call.

In step 520, the telephone prompts the caller to leave a message on the telephone. A default message or a pre-recorded message by the user is played by the telephone. After receiving the message, in step 525, the telephone stores the received message in a storage medium. In one embodiment, the storage medium is a random access memory or flash memory. In another embodiment, the storage medium is a cassette tape player with playback capabilities.

In step 530, the telephone retrieves the message, and in step 540, the telephone begins the forwarding process. The telephone attempts to deliver the message to all of the pre-selected telephone numbers. If a telephone number is inaccessible, the telephone attempts to deliver the message up to a maximum number of attempts. If the message is not delivered after the maximum number of attempts, the telephone generates an error message indicating the inaccessible telephone numbers.

What is claimed is:

1. A method for enabling a caller to leave a message on a telephone without the telephone first generating a ring sound, the method comprising:

the telephone receiving an incoming telephone call from a caller;

the telephone answering the incoming telephone call, wherein the telephone answers the incoming telephone call prior to the telephone generating a ring sound;

receiving input from the caller indicating whether the caller desires to record a message or have the telephone generate a ring sound;

an answering machine unit receiving and recording a message from the caller in response to receiving caller input to record a message;

the telephone generating an alert sound to a callee indicating that the telephone received an incoming call and that the caller is able to leave a message on the telephone without the telephone first generating a ring sound;

the telephone generating a ring sound to the callee in response to receiving caller input indicating that the telephone should generate the ring sound.

2. The method of claim 1, wherein the answering machine unit receiving and recording a message further comprises:

the answering machine unit playing a message requesting the caller to leave a message;

the answering machine unit receiving a message from the caller;

the answering machine unit recording the message from the caller.

3. The method of claim 1, wherein the telephone generating a ring sound to alert a user of the telephone to the incoming telephone call further comprises:

receiving input from the user to communicate with the caller in response to the telephone generating the ring sound the telephone connecting the user and the caller in response to the receiving input from the user;

wherein the user and the caller engage in voice communication after the telephone connecting the user and the caller.

4. The method of claim 1, further comprising receiving user input to enable a ring or message option feature prior to the telephone receiving the incoming telephone call from the caller.

5. The method of claim 4, wherein the receiving user input to enable the ring or message option feature comprises receiving user input manipulating a switch on the telephone, and wherein the switch toggles between enabling the ring or message option feature and disabling the ring or message option feature.

6. The method of claim 4, wherein the receiving user input to enable the ring or message option feature comprises a keypad of the telephone receiving user input comprising a numeric code.

7. The method of claim 1, wherein the alert sound is different from the ring sound.

8. A telephone with a ring or message option feature which enables a caller to selectively either leave a message on the telephone without the telephone first generating a ring sound or generate ring sounds to alert the user of the telephone call, the telephone comprising:

a port for coupling to a telephone line for receiving a telephone signal;

a ring or message option logic unit coupled to the port;

an answering machine unit coupled to the ring or message option logic unit;

a ringer coupled to the ring or message option logic unit;

an alert sound speaker coupled to the ring or message option logic unit, wherein the alert sound speaker is operable to generate an alert sound indicating that the telephone received an incoming call and that the caller is able to leave a message on the telephone without the telephone first generating a ring sound;

wherein the ring or message option logic is operable to receive user input from the caller indicating whether the caller desires to record a message or have the telephone generate a ring sound, wherein the ring or message option logic unit transfers control to the answering machine unit when the ring or message option logic unit receives input from the caller to access the answering machine unit;

wherein the ring or message option logic unit transmits an electrical signal to the ringer to generate a ring sound when the ring or message option logic unit receives input from the caller to generate the ring sound.

9. The telephone system of claim 8, further comprising:

a keypad coupled to the ring or message option logic unit, wherein the keypad is configured to receive a first numeric code for enabling the ring or message option feature and a second numeric code for disabling the ring or message option logic feature.

10. The telephone system of claim 8, further comprising a ring or message option switch, wherein the ring or message option switch is operated by a user of the telephone to enable and disable the ring or message option feature.

11. The telephone system of claim 8, wherein the answering machine unit is operable to:

play a message requesting the caller to leave a message;

receive a message from the caller;

record the message from the caller.

12. The telephone system of claim 8, further comprising a slave telephone connected on the same telephone line, wherein the slave telephone is operable to:

answer the incoming telephone call, wherein the slave telephone answers the incoming telephone call prior to the slave telephone generating a ring sound;

receive input from the caller indicating whether the caller desires to record a message or have the telephone generate a ring sound;

generate a ring sound to alert a user to the incoming telephone call in response to receiving caller input indicating that the telephone should generate the ring sound.

13. The telephone system of claim 8, wherein the alert sound speaker generates a sound that is different from the ring sound.

* * * * *